United States Patent
Sundstrom

(10) Patent No.: US 7,657,171 B2
(45) Date of Patent: Feb. 2, 2010

(54) METHOD AND SYSTEM FOR PROVIDING BACKGROUND BLURRING WHEN CAPTURING AN IMAGE USING AN IMAGE CAPTURE DEVICE

(75) Inventor: Robert J. Sundstrom, Cary, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 300 days.

(21) Appl. No.: 11/427,415

(22) Filed: Jun. 29, 2006

(65) Prior Publication Data

US 2008/0002961 A1 Jan. 3, 2008

(51) Int. Cl.
*G03B 3/10* (2006.01)

(52) U.S. Cl. .............. 396/133; 396/79; 396/82; 396/429; 348/208.12; 348/345; 348/348

(58) Field of Classification Search .......... 396/79, 396/82, 133, 429
See application file for complete search history.

(56) References Cited

U.S. PATENT DOCUMENTS

| | | | |
|---|---|---|---|
| 4,345,825 A | 8/1982 | Matteson et al. | |
| 4,545,665 A | 10/1985 | Aihara | |
| 4,843,416 A | 6/1989 | Brower | |
| 4,998,126 A | 3/1991 | Kazami | |
| 5,124,741 A | 6/1992 | O'Such et al. | |
| 5,264,930 A * | 11/1993 | Florence et al. | 348/164 |
| 5,392,089 A | 2/1995 | Fox | |
| 5,617,174 A * | 4/1997 | Mikami | 396/95 |
| 5,710,829 A * | 1/1998 | Chen et al. | 382/173 |
| 5,874,994 A * | 2/1999 | Xie et al. | 348/349 |
| 6,453,124 B2 | 9/2002 | Morimoto et al. | |
| 6,556,784 B2 * | 4/2003 | Onuki | 396/52 |
| 6,600,878 B2 | 7/2003 | Pregara | |
| 6,646,687 B1 * | 11/2003 | Vlahos | 348/586 |
| 6,760,545 B1 * | 7/2004 | Keith et al. | 396/61 |
| 6,900,841 B1 * | 5/2005 | Mihara | 348/345 |
| 6,940,555 B2 | 9/2005 | Okisu et al. | |
| 7,053,953 B2 | 5/2006 | Belz et al. | |
| 2001/0012063 A1 * | 8/2001 | Maeda | 348/222 |

(Continued)

FOREIGN PATENT DOCUMENTS

JP 6303491 10/1994

OTHER PUBLICATIONS

Fleming, D., "Increasing Background Blur In Photographs," Dofmaster, 2002 [retrieved on Mar. 13, 2006] Retrieved from the Internet: <URL:http://www.dofmaster.com/backgroundblur.html>, 3 pages.

(Continued)

*Primary Examiner*—Melissa J Koval
*Assistant Examiner*—Warren K Fenwick

(57) ABSTRACT

A method and system are described for providing background blurring when capturing an image using an image capture device. According to one aspect, input is received for initiating an image capture process for capturing an image of a subject at an image capture device. A focus value corresponding to a focus distance that is less than a distance between the subject and the image capture device and that keeps the subject within a depth of field corresponding to the focus distance is automatically determined. The image is captured using the determined focus value.

22 Claims, 5 Drawing Sheets

U.S. PATENT DOCUMENTS

| | | | |
|---|---|---|---|
| 2001/0036319 A1* | 11/2001 | Sakaida et al. | 382/232 |
| 2001/0045982 A1* | 11/2001 | Okisu et al. | 348/211 |
| 2002/0060739 A1* | 5/2002 | Kitamura et al. | 348/222 |
| 2002/0093670 A1* | 7/2002 | Luo et al. | 358/1.9 |
| 2005/0001924 A1 | 1/2005 | Honda | |
| 2005/0128312 A1* | 6/2005 | Fredlund et al. | 348/222.1 |
| 2006/0098970 A1* | 5/2006 | Sato | 396/121 |
| 2007/0132874 A1* | 6/2007 | Forman et al. | 348/333.02 |
| 2007/0248330 A1* | 10/2007 | Pillman et al. | 386/107 |

OTHER PUBLICATIONS

Leong, E., "Photography e-Book Chapter 18—Depth of Field," CameraHobby.com [retrieved on May 25, 2006] Retrieved from the Internet: <URL:http://www.camerahobby.com/EBook-DepthField_Chapter18.html>, 4 pages.

"Can You Blur The Background?" CanonPhotoGroup.com, [retrieved on May 25, 2006] Retrieved from the Internet: <URL:http://forums.powershot-a.com/showthread.php?s=%20f25e381193a112acb957cb678a1ffb1e&threadid=9733>, 3 pages.

Hallstein, T., "Focus Pocus," Outsight Environmental Photography [retrieved on May 25, 2006] Retrieved from the Internet: <URL:http://www.outsight.com/hyperfocal.html>, 5 pages.

Wrotniak, A., "Photo Tidbids: Depth of field and your digital camera," Photo Tidbids, Dec. 7, 2000 [retrieved on May 25, 2006] Retrieved from the Internet: <URL:http//http://www.wrotniak.net/photo/dof/>, 11 pages.

"Pixels to Pictures," Kodak [retrieved on Mar. 13, 2006] Retrieved from the Internet: <URL:http://www.kodak.com/US/en/corp/researchDevelopment/technologyFeatures/pixPic.shtml>, 6 pages.

* cited by examiner

Background (or part of it) falls inside depth of field and is therefore not entirely blurry Depth of field is moved forward

METHOD AND SYSTEM FOR PROVIDING BACKGROUND BLURRING WHEN CAPTURING AN IMAGE USING AN IMAGE CAPTURE DEVICE

BACKGROUND

When taking a photo, especially a portrait of a person of group of people, it is often desirable to deliberately blur the background. This is usually done for aesthetic effect—to make the people stand out better and to help hide distracting or undesirable backgrounds.

Creating a photo with maximum background blurring will also aid a subsequent image processing task of removing the background so that a different background can be substituted. Background removal techniques include edge and gradient analysis; maximum background blurring helps this analysis by removing or softening edges in the background, thus reducing the number of edges to follow and making the key edges of interest, namely those around the foreground subject, easier to find and follow.

Generally speaking, the depth of field is the distance in front of and behind the subject that appears to be in focus. Accordingly, items outside the depth of field, e.g., background, are not in focus, i.e., are blurry. It is well known by skilled photographers that there are a set of techniques that can be used to control the depth of field in an image and therefore to control the blurring of the background. One such technique involves adjusting the aperture setting—the larger the aperture the smaller the depth of field. Some cameras have a portrait mode that sets the camera to use a wide aperture.

Another technique to control the depth of field in an image involves the focal length and the subject distance. Longer focal lengths (corresponding to more powerful zoom settings) produce smaller depths of field. Moving towards the subject achieves roughly the same effect and is complimentary. Both techniques can be used in combination—when the subject fills more of the viewfinder the depth of field is reduced. Thus, the photographer can use a higher zoom or move closer to the subject or do a combination of these to enlarge the subject in the viewfinder and decrease the depth of field.

These techniques require the user to be a somewhat sophisticated photographer to carry them out successfully to enhance background blurring. Moreover, in some cases, the background is too close to the subject to allow for adequate blurring while maintaining the subject in focus. In other words, the depth of field cannot be set small enough to cover only the subject without any portion of the background. As discussed above, depth of field depends on variables that may or may not be entirely controllable by the user. For example, the level of zoom used is, to some degree, dependent on the distance to the subject, which may not always be controllable by the user.

Accordingly, there exists a need for methods, systems, and computer program products for providing background blurring when capturing an image using an image capture device.

SUMMARY

In one aspect of the subject matter disclosed herein, a method for providing background blurring when capturing an image using an image capture device includes receiving input for initiating an image capture process for capturing an image of a subject at an image capture device. A focus value corresponding to a focus distance that is less than a distance between the subject and the image capture device and that keeps the subject within a depth of field corresponding to the focus distance is automatically determined. The image is captured using the determined focus value.

In another aspect of the subject matter disclosed herein, a system for providing background blurring when capturing an image using an image capture device includes means for receiving input for initiating an image capture process for capturing an image of a subject at an image capture device; means for automatically determining a focus value corresponding to a focus distance that is less than a distance between the subject and the image capture device and that keeps the subject within a depth of field corresponding to the focus distance; and means for capturing the image using the determined focus value.

In another aspect of the subject matter disclosed herein, a system for providing background blurring when capturing an image using an image capture device includes an image capture initiator component configured for receiving input for initiating an image capture process for capturing an image of a subject at an image capture device; a blurring function configured for automatically determining a focus value corresponding to a focus distance that is less than a distance between the subject and the image capture device and that keeps the subject within a depth of field corresponding to the focus distance; and an image capture function configured for capturing the image using the determined focus value.

In another aspect of the subject matter disclosed herein, a computer readable medium containing a computer program for providing background blurring when capturing an image using an image capture device includes executable instructions for receiving input for initiating an image capture process for capturing an image of a subject at an image capture device; automatically determining a focus value corresponding to a focus distance that is less than a distance between the subject and the image capture device and that keeps the subject within a depth of field corresponding to the focus distance; and capturing the image using the determined focus value.

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, store, communicate, propagate, or transport instructions for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a portable digital video disc (DVD), a wired network connection and associated transmission medium, such as an ETHERNET transmission system, and/or a wireless network connection and associated transmission medium, such as an IEEE 802.11 (a), (b), or (g) or a BLUETOOTH transmission system, a wide-area network (WAN), a local-area network (LAN), the Internet, and/or an intranet.

Thus, the subject matter described herein can be embodied in many different forms, and all such forms are contemplated to be within the scope of what is claimed.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION

Figure 1:
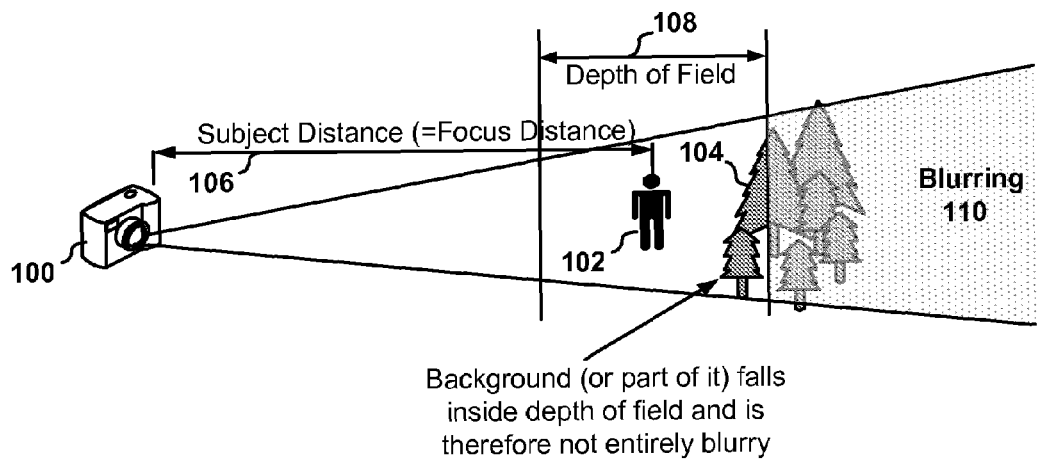
FIGS. 1 and 2 are diagrams for illustrating a technique for providing background blurring when capturing an image using an image capture device.
Figure 2:
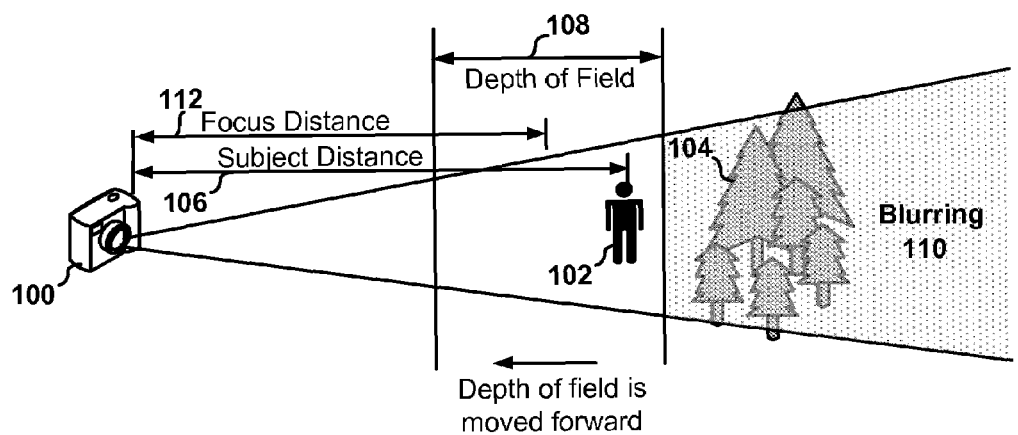

FIGS. 1 and 2 are diagrams illustrating a technique for providing background blurring when capturing an image using an image capture device. In FIG. 1, an image capture device 100 is shown capturing an image of a subject 102 in front of a background 104. The image capture device 100 can be, for example, a still camera (digital, analog, and/or film), a video camera (digital, analog, and/or film), a camera phone, a personal digital assistant (PDA) with image capture, and/or any device having image capture capabilities. The distance from the image capture device 100 to the subject 102, referred to herein as the subject distance 106, is typically determinative of a value and/or calculation used by the image capture device 100 to focus the subject in the captured image, which is referred to herein as a "focus value." A focus value that is based on the subject distance 106 is typically determined by an autofocus function in modern conventional image capture devices. As will be described below, other focus values that provide the image capture device 100 with information for focus on distances other than the subject distance can be determined and used to control the image capture device 100 to focus, for example, in front of the subject 102.

There are two broad types of techniques for autofocus in modern image capture devices: active and passive. Active autofocus systems, such as the one described in U.S. Pat. No. 4,843,416, bounce a signal, such as an infrared pulse, off the subject and judge the distance by measuring the amount of the signal that is reflected back to a sensor on the image capture device. Passive systems are commonly found in single-lens reflex (SLR) cameras and determine the distance to the subject through an analysis of the image. U.S. Pat. No. 6,600,878 describes a passive autofocus system. When the image is in focus, the distance to the subject can be determined by the position of the lens.

As illustrated in FIG. 1, during conventional image capture, autofocus is determined based on a subject distance 106. That is, the distance used for automatically focusing on the subject 102, referred to herein as the focus distance, is the same as the subject distance 106. Also illustrated in FIG. 1 is a depth of field distance 108, which is the distance in front of and behind the focus distance that appears to be in focus. For any given lens setting, there is only one focus distance at which a subject is precisely in focus, but focus falls off gradually on either side of that distance. The depth of field 108 represents a region within which objects are at or above a tolerable level of focus and outside which objects are considered blurred 110.

In FIG. 2, the image capture device 100 is shown capturing an image of the subject 102 in front of the background 104 while providing background blurring 110 when capturing an image according to an aspect of the subject matter described herein. The subject distance 106 remains the same in FIG. 2 as it is in FIG. 1. Instead of using this subject distance 106 as the focus distance, i.e., for determining the focus value, a different value for the focus distance 112 is used. The focus distance 112 value is shorter than the subject distance 106, which effectively moves the depth of field 108 forward such that the subject 102 is further back within the depth of field 108. This results in additional blurring 110 of the background 104. For example, comparing FIG. 2 to FIG. 1, it becomes evident that the "rear wall" of the depth of field 108 is closer to the subject 102. As a result, backgrounds 104 (or portions of backgrounds 104) near the subject 102 in FIG. 2 are outside the depth of field 108 and therefore are blurred 110 in the captured image. In contrast, in the conventional image capture illustrated in FIG. 1, part of the background 104 falls within the depth of field 108 and is therefore not blurry 110 in the captured image.

Figure 3:
FIG. 3 is a diagram illustrating an image captured while providing background blurring according to an aspect of the subject matter described herein.

FIG. 3 is a diagram illustrating an image captured while providing background blurring 110 according to an aspect of the subject matter described herein. In FIG. 3, the subject 102 is a mother and daughter planting a flower while the background 104 is an unpleasant construction site in a cityscape. As discussed above, such deliberate blurring of the background may be employed for aesthetic effect—to make the people stand out better and to help hide distracting or undesirable backgrounds, and/or to aid a subsequent image processing task of removing the background so that a different background can be substituted.

Figure 4:
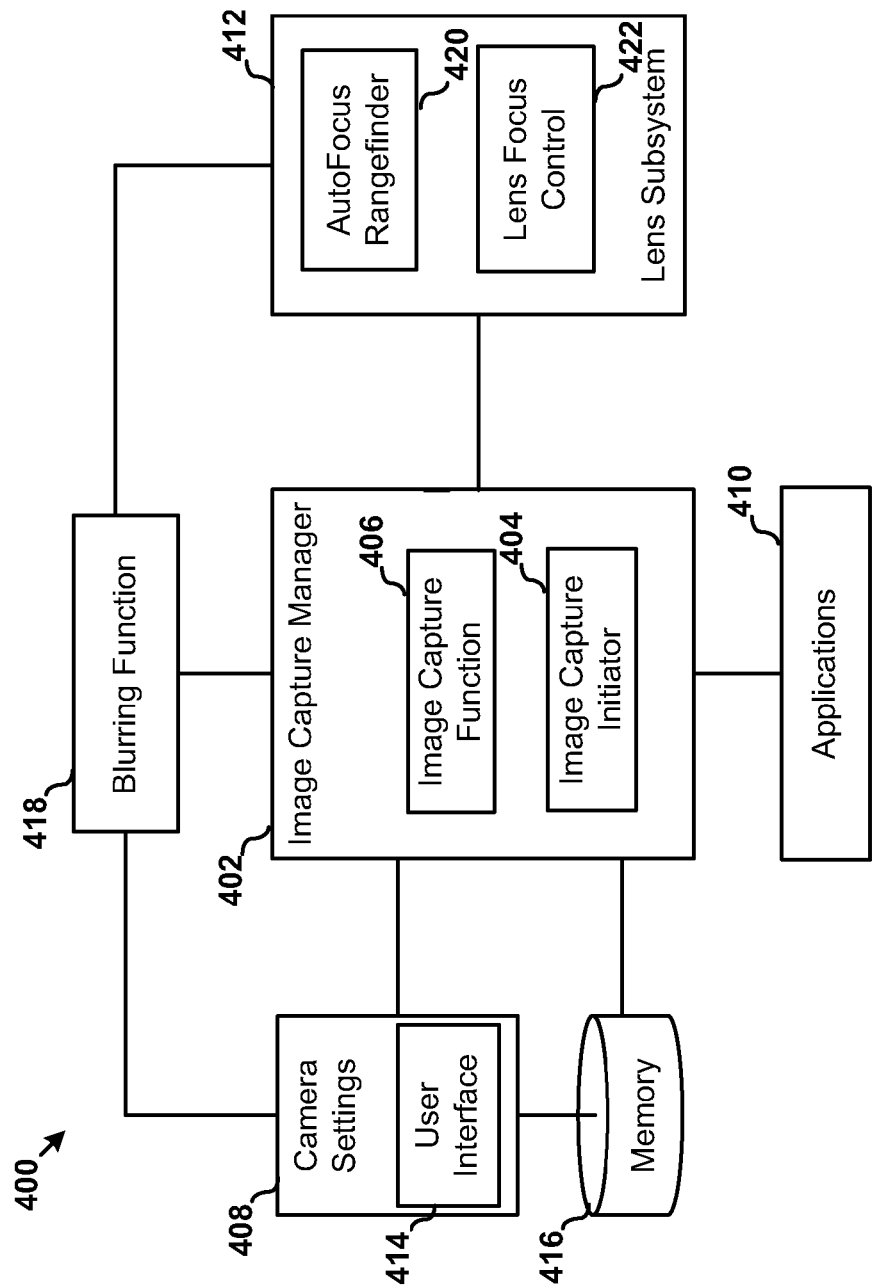
FIG. 4 is a block diagram illustrating a system for providing background blurring when capturing an image using an image capture device according to an aspect of the subject matter disclosed.

FIG. 4 is a block diagram illustrating a system 400 for providing background blurring when capturing an image using an image capture device according to an aspect of the subject matter disclosed. In FIG. 4, the system 400 includes means for receiving input for initiating an image capture process for capturing an image of a subject at the image capture device 100. For example, an image capture manager component 402 includes an image capture initiator component 404 and an image capture function component 406. The image capture initiator component 404 is configured for receiving input for initiating an image capture process for capturing an image of a subject at the image capture device 100. The image capture manager 402 controls the image capture process. For example, for capturing an image, the image capture manager 402 can determine camera settings 408 and interact with applications 410 and a lens subsystem 412 to focus the camera lens and to set the shutter speed and aperture. The camera settings component 408 can include a user interface 414 for receiving preferred camera settings from a user. Camera settings can be received from the user via the user interface 414, can be predefined camera settings stored in a memory 416, can be received from one or more applications 410, and/or can be calculated by camera settings component 408 based on user input from user interface 414 and/or one or more sensors (not shown) associated with the image capture device 100. The image capture initiator 404 can monitor camera settings 408, including user interface 414, and/or applications 410 to determine when an image capture process is initiated. For example, when a user either partially or completely depresses a shutter button, the image capture initiator 404 can be invoked and the image capture manager 402 takes the appropriate steps needed for image capture.

The lens subsystem 412 can include an autofocus rangefinder component 420 for determining the subject distance 106 based on an initial focus value that would be required for a conventional image capture taken at the subject distance 106 using any of the methods described above. For example, the subject distance can be determined by the autofocus rangefinder 420 using an active and/or passive autofocus technique. The lens subsystem 412 can also include a lens focus control component 422 that controls the lens motor to adjust the lens to focus the lens. In an active autofocus system, the lens focus control component 422 adjusts the lens based on a determined subject distance 106 determined by autofocus rangefinder 420. In a passive autofocus system, the lens focus control component 422 adjusts the lens until the subject is in focus as determined by image analysis performed by image capture manager 402, and the subject distance can be derived from the final lens position.

The system 400 also includes means for automatically determining a focus value corresponding to a focus distance that is less than a distance between the subject and the image capture device 100 and that keeps the subject within a depth of field corresponding to the focus distance. For example, a blurring function 418 can be configured for automatically determining a focus value corresponding to a focus distance that is less than a distance between the subject and the image capture device 100 and that keeps the subject within a depth of field corresponding to the focus distance. According to one aspect, the autofocus rangefinder 420 determines the subject distance 106 (or a focus value corresponding to the subject distance 106) in an active autofocus system. According to another aspect, in a passive autofocus system, image capture manager 402 determines the subject distance 106 (or a focus value corresponding to the subject distance 106). Once the subject distance (or subject distance focus value) is determined, the blurring function 418 determines a focus value corresponding to a focus distance that is less than the subject distance and that keeps the subject within a depth of field corresponding to the focus distance. The determined focus value can then be used by the lens focus control 422 to focus the lens subsystem 412 at a point corresponding to the focus distance. That is, the focus value is effectively any value that can be used by the lens focus control 422 to focus the lens subsystem 412.

As will be described below, the focus distance can be a calculated value based on depth of field equations or can be store values that can be tabulated and/or cross-referenced to the subject distance and/or one or more camera settings. In either case, the determined focus value can be adjusted for the depth or thickness of the subject(s) as well as for a parameter called "circle of confusion" that determines what is considered be an acceptable level of focus. More particularly, the circle of confusion specifies the level of blurring that is allowable while still providing for the subject to be in focus. The greater the allowable circle of confusion, the greater the depth of field. What is considered acceptable can vary according to how the user expects to print or display the image. For example, an image intended for a 4×6 print or 8×10 print will have a smaller allowable circle of confusion than one intended for inclusion as a moderate sized image in an email. One common definition for the circle of confusion is the largest circle of blur on a film negative (or in a captured image) that will still be perceived by the human eye as a clean point when printed at 8"×10" size and viewed from a normal viewing distance of 2-3 feet. The circle of confusion parameter can be chosen by the camera manufacturer and/or can be provided via user input.

The camera settings component 408 provides the camera settings needed to the blurring function 418 to determine the focus value corresponding to the focus distance 112. The camera settings that can be used include aperture, focal length, circle of confusion, and subject depth. The circle of confusion and the subject depth can be preset by the manufacturer and stored in memory 416 or provided to the camera by the user through the user interface 414. The focal length can be preset by the manufacturer and stored in memory 416 if there is a single focal length and/or can be sensed and provided by the camera if there is a zoom lens. The aperture setting can also be sensed by the camera. The focal length and aperture settings can be determined using techniques known to one of skill in this art. In addition, some or all of this information can be read from image metadata stored by digital cameras. For example, KODAK maintains a website (see www. Kodak.com/US/en/corp/researchDevelopment/technologyFeatures/pixPic.shtml, omitting all spaces in URL) that describes the operation of a digital camera and the various settings and their function as well as the role of image metadata in camera settings.

According to one embodiment, the focus distance 112 illustrated in FIG. 2 can be determined through computations by blurring function 418. The focus value corresponding to the focus distance 112 can then be used by the lens focus control 422 for focusing the lens to a focus distance that is less than a distance between the subject 102 and the image capture device 100 and that keeps the subject 102 within a depth of field corresponding to the focus distance 112. To determine the desired focus distance, a relationship between the focus distance, the subject distance and one or more other variables and/or camera settings can be used, since the subject distance can be provided by the image capture device 100 as described above. An example of one such relationship that can be used is provided below.

To determine a relationship between the focus distance 112 and subject distance 106, it is helpful to write an expression for the distance from the image capture device 100 to the rear wall of the depth of field 108. The distance to the rear wall of the depth of field 108 can be expressed in terms of the hyperfocal distance, which represents the distance at which to focus a lens to make everything from half the distance to infinity acceptably sharp. The hyperfocal distance, H, can be expressed based on camera settings/parameters as shown in Equation 1:

$$H=(L\times L)/(f\times c) \qquad \text{Eq. 1}$$

Where:
H=hyperfocal distance (in millimeters)
L=lens focal length (e.g., 35 mm, 105 mm)
f=lens aperture (f-stop)
c=diameter of circle of least confusion (in millimeters)

The distance to the rear wall of the depth of field, R, can be expressed based on the hyperfocal distance, H, and focus distance, D, as shown in Equation 2:

$$R = (H \times D)/(H - D + L) \qquad \text{Eq. 2}$$

Where:

R=distance to the rear wall of the depth of field (in millimeters)

H=hyperfocal distance (in millimeters)

D=focus distance (in millimeters)

L=lens focal length (e.g., 35 mm, 105 mm)

Solving Equation 2 for the focus distance, D, yields Equation 3 below:

$$D = R \times (H + L)/(R + H) \qquad \text{Eq. 3}$$

Accordingly, the focus distance 112 can be expressed in terms of the hyperfocal distance, H, and the distance to the rear wall of the depth of field, R, as shown in Equation 3. The hyperfocal distance, H, is calculated from camera settings as shown in Equation 1. The distance to the rear wall of the depth of field, R, can be determined based on the subject distance 106 and a factor to allow for the depth of the subject 102. More particularly, R can be expressed as:

$$R = S + d \qquad \text{Eq. 4}$$

Where:

S is the subject distance determined by the image capture device, and d is the depth factor, i.e., thickness, of the subject.

The subject distance 106 can be determined by the image capture device 100 using any method known in this art, such as active and/or passive autofocus as described above. The depth factor, d, can be a preset value stored in the memory 416, can be entered by the user via the user interface 414, or can be omitted altogether (set to zero). Once the focus distance 112 is determined by the blurring function 418, the blurring function 418 can provide a corresponding focus value to lens focus control 422 for capturing the image.

Examples are given below for calculating the focus distance.

Example 1

For 35 mm Format

L=35 mm f=4.0 c=0.03

R=5000 mm (subject distance S=4800 mm and depth d=200 mm)

H=L×L/fxc=35×35/4.0×0.03=10208 mm

D=R×(H+L)/(R+H)=5000×(10208+35)/(5000+10208) =3367 mm

Thus, while the subject distance is 4.80 m, the calculated focus distance is 3.34 m, which results in moving the depth of field forward 1.46 m, thus effectively moving the subject rearward in the depth of field by 1.46 m.

Put another way, the new rear wall of the depth of field is at 5 m, while the original rear wall of the depth of field (when focused directly on the front of the subject) is:

$$R = (H \times D)/(H - D + L) = 10208 \times 4800/10208 - 4800 + 35 = 9002 \text{ mm}$$

Thus, the rear wall of the depth of field is moved in from approximately 9 m to 5 m while maintaining acceptable sharpness for the subject. Accordingly, more of the background is outside the depth of field, thus providing for additional background blurring.

Example 2

55 mm Format

L=55 mm f=2.8 c=0.03

R=5000 mm (subject distance S=4800 mm and depth d=200 mm)

H=L×L/fxc=55×55/2.8×0.03=36012 mm (36 meters)

D=R×(H+L)/(R+H)=5000×(36012+55)/(5000+36012) =4397 mm

Thus, while the subject distance is 4.80 m, the calculated focus distance is approximately 4.4 m, which results in moving the depth of field forward 0.4 m, thus effectively moving the subject rearward in the depth of field by 0.4 m.

The new rear wall of the depth of field is at 5 m, while the original rear wall of the depth of field (when focused directly on the front of the subject) is:

$$R = (H \times D)/(H - D + L) = 36012 \times 4800/36012 - 4800 + 55 = 5528 \text{ mm}$$

In this case, the effect is less dramatic—the rear wall of the depth of field is moved in from approximately 5.5 m to 5 m while maintaining acceptable sharpness for the subject. Nonetheless, this will help to increase the blurring of the background while maintaining the sharpness of the subject.

According to another embodiment, one or more focus distance tables are maintained in the memory 416 and are accessed to determine the focus value that is based on the new, reduced focus distance 112. This approach is most practical when one or more of the settings, such as the circle of confusion, subject depth, and focal length of the lens, are known or preset. The focus distance table(s) can be used in place of some or all of the calculations to determine the focus distance 112 (for determining the focus value). In the most general case, the reduced focus distance can be based on five parameters:

1. Subject distance
2. Lens focal length
3. Aperture setting
4. Circle of confusion
5. Depth of subject.

Tables that take into account all five of these parameters could be unwieldy. However, this technique becomes more practical if some of these parameters are fixed, and this will often be the case. The circle of confusion and/or the depth of the subject can be selected as constants by the manufacturer. The aperture can also be a constant that is preset for all but interchangeable lens cameras. The focal length is variable on cameras that have a zoom lens, but otherwise it is a constant set by the manufacturer. In addition, one or more of these settings can be received via user interface 414 either individually or as part of a set of settings active when the image capture device is placed in a certain mode, such as an "enhanced blurring mode," "portrait mode," and the like. Furthermore, one or more of these settings can be received from an application 410 associated with the image capture device 100. Table 1 below illustrates one table format that may be used where the subject distance 106 is the only variable input (other values are fixed or otherwise known).

TABLE 1

| Subject Distance (mm) | Focus distance (mm) |
|---|---|
| 4800 mm | 3340 mm |

If both the subject distance and the lens focal length are variable, then a table similar to Table 2 can be used.

TABLE 2

| Lens Focal Length (mm) | Subject Distance (mm) | Focus distance (mm) |
|---|---|---|
| 35 mm | 4800 mm | 3340 mm |
| 55 mm | 4800 mm | 4400 mm |

If the aperture is also a variable, then a table format that cross-references the aperture can be employed. In fact, a table, or any like device, for cross-referencing the focus value or a value used to determine the focus value to at least one of a distance between the subject and the image capture device, an aperture setting, a focal length, a circle of confusion, and a subject depth, for example, can be employed.

The system 400 also includes means for capturing the image using the determined focus value. For example, the system 400 can include an image capture function 406 configured for capturing the image using the determined focus value. Once the blurring function 418 determines a focus value corresponding to the determined focus distance 112, the focus value can be provided to the image capture manager 402 and/or the lens subsystem 412 for capturing an image using the focus value. For example, the lens focus control 422 can adjust the lens focus based on the determined focus value and the image capture function 406 can perform the steps necessary for capturing the image.

It should be understood that the various components illustrated in the figures represent logical components that are configured to perform the functionality described herein and may be implemented in software, hardware, or a combination of the two. Moreover, some or all of these logical components may be combined and some may be omitted altogether while still achieving the functionality described herein.

Figure 5:
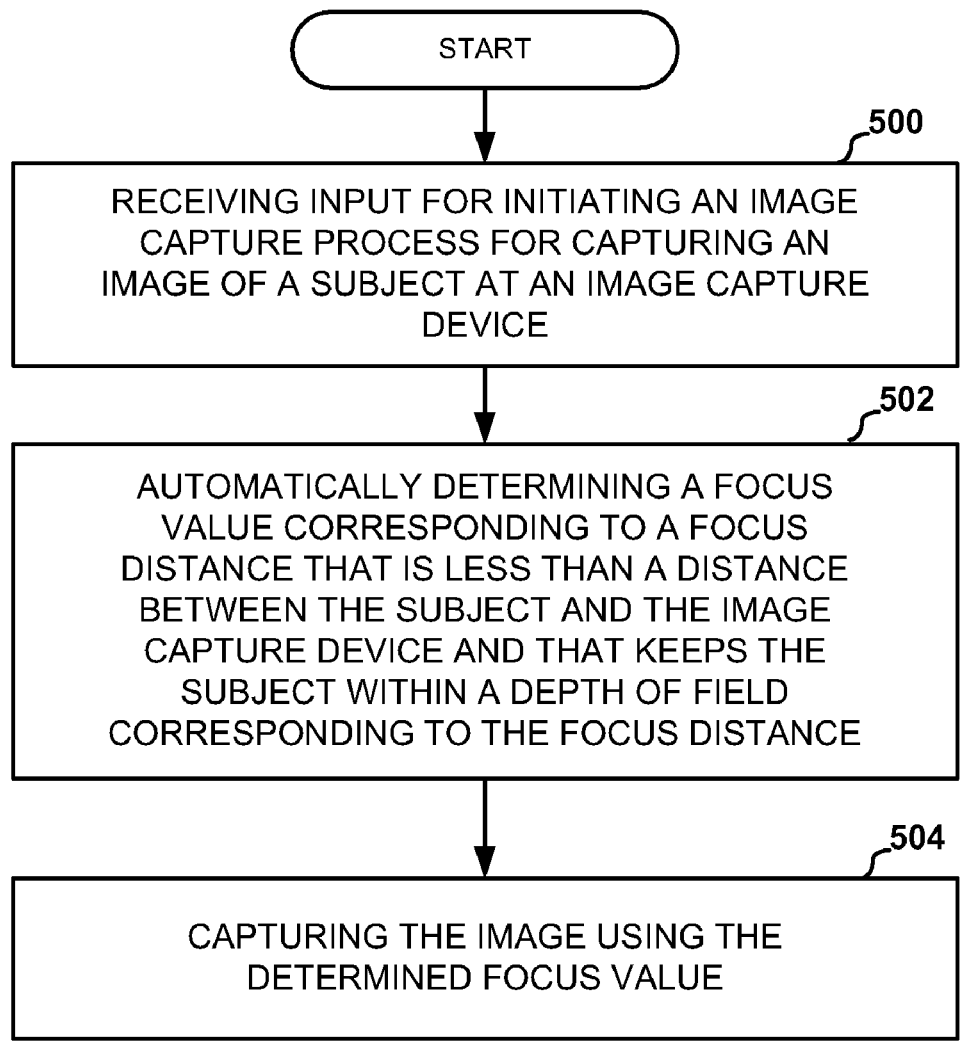
FIG. 5 is a flow diagram illustrating a method for providing background blurring when capturing an image using an image capture device according to an aspect of the subject matter described herein.

FIG. 5 is a flow diagram illustrating a method for providing background blurring when capturing an image using an image capture device 100 according to an aspect of the subject matter described herein. In FIG. 5, an input for initiating an image capture process for capturing an image of a subject at an image capture device 100 is received in block 500. For example, according to one aspect, an input can be received from the user interface 414 of the image capture device 100. The image capture initiator component 404 can be configured for receiving input, such as a shutter button depression, from the user interface 414 of the image capture device 100 for initiating the image capture process. According to another aspect, input can be received from an application 410 associated with the image capture device 100. The image capture initiator component 404 is configured for receiving input from an application 410 associated with the image capture device 100 for initiating the image capture process.

In block 502, a focus value corresponding to a focus distance 106 that is less than a distance between the subject and the image capture device 100, and that keeps the subject 102 within a depth of field 108 corresponding to the focus distance 112, is determined. According to one aspect, the blurring function 418 is configured for determining the focus value corresponding to a focus distance 112 by determining the subject distance 106; determining, based on the determined subject distance 106, the focus distance that is less than the subject distance 106 and that keeps the subject in the depth of field corresponding to the focus distance 112; and determining the focus value corresponding to the focus distance 112. According to another aspect, determining the subject distance 106 can include determining the focus value based on an autofocus value for the subject distance 106. For example, the autofocus rangefinder function 420 can be configured for providing the blurring function 418 with the subject distance 106 based on an autofocus value for the subject distance 106 determined using active or passive autofocus techniques. The subject distance 106 can be used by the blurring function for determining the focus value corresponding to the focus distance 112. According to another aspect, the blurring function can be configured to determine the focus value corresponding to the focus distance based on at least one of an aperture setting, a focal length, a circle of confusion, and a subject depth. One or more of the aperture setting, focal length, circle of confusion, and subject depth can be preset in the image capture device 100. The user interface 414 can receive from a user at least one of an aperture value, a focal length, a circle of confusion, and a subject depth, based on settings provided via the user interface.

In alternate embodiment, at least one of an aperture value, a focal length, a circle of confusion, and a subject depth are used to cross-reference to a corresponding focus distance in a table stored in the memory 416 as described above, and the blurring function is configured to retrieve the focus value or a value used to determine the focus value from the table.

In block 504, an image is captured using the determined focus value. For example, once the blurring function 418 determines a focus value corresponding to the determined focus distance 112, the focus value can be provided to the image capture manager 402 and/or the lens subsystem 412 for capturing an image using the focus value. The lens focus control 422 can adjust the lens focus based on the determined focus value and the image capture function 406 can perform the steps necessary for capturing the image.

Figure 6:
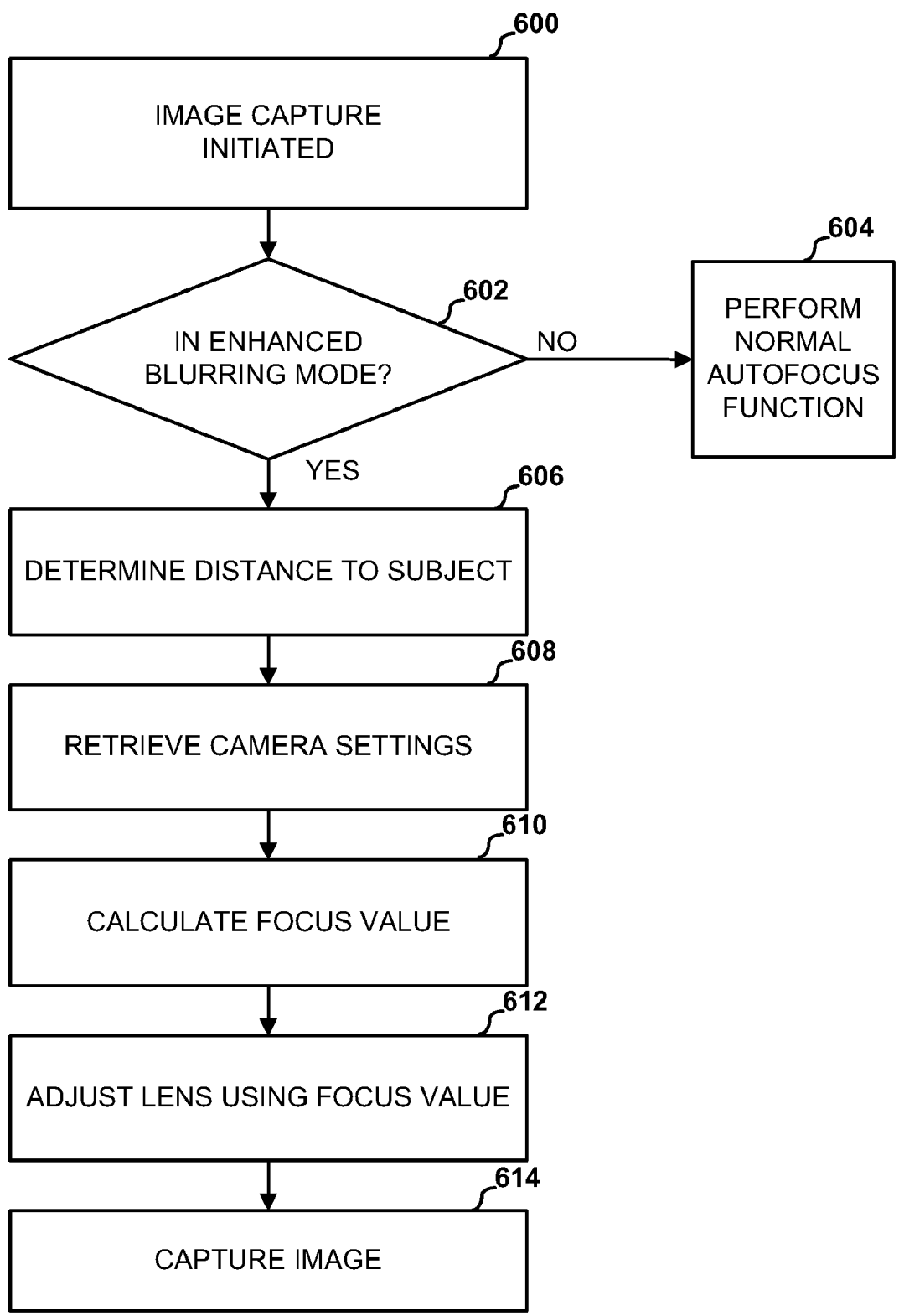
FIG. 6 is a flow diagram illustrating a method for providing background blurring when capturing an image using an image capture device according to another aspect of the subject matter described herein.

FIG. 6 is a flow diagram illustrating a method for providing background blurring when capturing an image using an image capture device 100 according to another aspect of the subject matter described herein. In FIG. 6, image capture is initiated in block 600. As discussed above, image capture initiator 404 can receive an indication from a user via the user interface 414, such as the depressing of the shutter button on the image capture device 100. Alternatively, image capture may be initiated by an application 410, such as a timer application for timed image captures, an application on a remote device that sends an image capture instruction via a network, or any other input means which initiate a capture such as a script or loadable application module.

At decision point 602, the image capture manager 402 can optionally check the camera settings 408 to determine whether the camera is in an "enhanced blurring mode." This provides user (or application) control over the enhanced blurring control described herein. If the image capture manager 402 determines at decision point 602 that the image capture device 100 is not in enhanced blurring mode, then the normal focusing method of the image capture device is invoked in block 604. If the image capture manager 402 determines at decision point 602 that the image capture device 100 is in enhanced blurring mode, then the subject distance 106 is determined in block 606 as described above. For example, the autofocus rangefinder 420 can determine the subject distance 106 using an active autofocus technique. Alternatively, the image capture manager 402 can determine the subject distance 106 using a passive autofocus technique.

In block 608, the camera settings 408 described above are retrieved, such as the aperture setting, focal length, circle of confusion, and/or subject depth, using any of the methods described above. For example, the circle of confusion may be set by the manufacturer or may be input by the user. In one embodiment, rather than requiring the user to know the circle of confusion setting, a set of settings are given common names that the user may select from such as email, quality print, or poster, making the choice easier for unsophisticated users. In another embodiment, the camera may calculate the circle of confusion based on other settings, such as the resolution of the image selected by the user.

In block 610, the blurring function 418 calculates the focus distance and the focus value is determined based on the focus distance. According to one embodiment, the focus distance 112 is determined using the equations above. According to another embodiment, the focus distance 112 is determined from a focus distance table based on the subject distance 106 and other settings/parameters. The focus value used by the lens focus control 422 and/or image capture function 406 to capture the image is determined based on the focus distance 112 by the blurring function 418.

In block 612, the lens focus control 422 focuses the lens to the focus distance 112 based on the determined focus value. The image capture manager 402 takes actions for capturing the image in block 614. For example, if the shutter button in the user interface 414 is only halfway depressed, the focus can be locked based on the focus value corresponding to the focus distance 112, but the image capture manager 402 does not capture the image until the shutter button is fully depressed. As discussed above, image capture can also be initiated by inputs from applications 410, which may be used to set and lock the focus with the image capture occurring sometime later or may initiate a process of readying the image capture device 100 to capture an image and then capture the image either immediately or based on another triggering event.

Exemplary User Scenario:

1. User sets camera to enhanced blurring setting.
2. Camera sets aperture to maximum.
3. Camera sets zoom to maximum and/or reminds user to use higher zoom or to get close to the subject so that the subject fills the viewfinder.
4. User points camera at subject and partially or completely depresses shutter button to engage autofocus mechanism.
5. Autofocus mechanism focuses as usual to get the subject distance and then adjusts the focus value to correspond to a focus distance that is less than a distance between the subject and the image capture device and that keeps the subject within a depth of field corresponding to the focus distance. This can be done using the equations/calculations described above and/or one or more focus distance tables.
6. The image is captured either immediately or after the shutter button is completely depressed.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for providing background blurring when capturing an image using an image capture device, the method comprising:

receiving input for initiating an image capture process for capturing an image of a subject at an image capture device;

automatically determining a focus value corresponding to a focus distance that is less than a distance between the subject and the image capture device and that keeps the subject within a depth of field corresponding to the focus distance; and capturing the image using the determined focus value to provide background blurring in the captured image.

2. The method of claim 1 wherein receiving input for initiating an image capture process includes receiving input from a user interface of the image capture device.

3. The method of claim 1 wherein receiving input for initiating an image capture process includes receiving input from an application associated with the image capture device.

4. The method of claim 1 wherein automatically determining a focus value corresponding to a focus distance comprises:

determining the distance from the image capture device to the subject;

determining, based on the determined subject distance, the focus distance that is less than the subject distance and that keeps the subject in the depth of field corresponding to the focus distance; and determining the focus value corresponding to the focus distance.

5. The method of claim 4 wherein determining the distance from the image capture device to the subject includes determining the focus value based on an autofocus value for the subject distance.

6. The method of claim 1 wherein automatically determining a focus value corresponding to a focus distance includes determining the focus value based on an autofocus value for the distance from the image capture device to the subject.

7. The method of claim 1 wherein automatically determining a focus value corresponding to a focus distance includes determining the focus value based on at least one of an aperture setting, a focal length, a circle of confusion, and a subject depth.

8. The method of claim 7 wherein at least one of an aperture value, a focal length, a circle of confusion, and a subject depth are preset in the image capture device.

9. The method of claim 7 wherein at least one of an aperture value, a focal length, a circle of confusion, and a subject depth are based on settings provided via a user interface.

10. The method of claim 1 wherein automatically determining a focus value includes retrieving the focus value or a value used to determine the focus value from a table stored in a memory of the image capture device and cross-referenced to at least one of a distance between the subject and the image capture device, an aperture setting, a focal length, a circle of confusion, and a subject depth.

11. A system for providing background blurring when capturing an image using an image capture device, the system comprising:

means for receiving input for initiating an image capture process for capturing an image of a subject at an image capture device;

means for automatically determining a focus value corresponding to a focus distance that is less than a distance between the subject and the image capture device and that keeps the subject within a depth of field corresponding to the focus distance; and means for capturing the image using the determined focus value to provide background blurring in the captured image.

12. A system for providing background blurring when capturing an image using an image capture device, the system comprising:

an image capture initiator component configured for receiving input for initiating an image capture process for capturing an image of a subject at an image capture device;

a blurring function configured for automatically determining a focus value corresponding to a focus distance that is less than a distance between the subject and the image capture device and that keeps the subject within a depth of field corresponding to the focus distance; and an image capture function configured for capturing the image using the determined focus value.

13. The system of claim 12 wherein the image capture device includes a user interface and the image capture initiator component is configured for receiving input from the user interface of the image capture device for initiating the image capture process.

14. The system of claim 12 wherein the image capture initiator component is configured for receiving input from an application associated with the image capture device for initiating the image capture process.

15. The system of claim 12 wherein the blurring function is configured for automatically determining a focus value by:
   determining the distance from the image capture device to the subject;
   determining, based on the determined subject distance, the focus distance that is less than the subject distance and that keeps the subject in the depth of field corresponding to the focus distance; and
   determining the focus value corresponding to the focus distance.

16. The system of claim 15 comprising an autofocus rangefinder function configured for providing the blurring function with the distance from the image capture device to the subject based on an autofocus value for the subject distance.

17. The system of claim 12 comprising an autofocus rangefinder function configured for providing the blurring function with a distance from the image capture device to the subject based on an autofocus value for the subject distance, wherein the distance from the image capture device to the subject is used by the blurring function for determining the focus value.

18. The system of claim 12 wherein the blurring function is configured to determine the focus value based on at least one of an aperture setting, a focal length, a circle of confusion, and a subject depth.

19. The system of claim 18 wherein at least one of an aperture value, a focal length, a circle of confusion, and a subject depth are preset in the image capture device.

20. The system of claim 18 wherein the image capture device includes a user interface and at least one of an aperture value, a focal length, a circle of confusion, and a subject depth are based on settings provided via the user interface.

21. The system of claim 12 wherein the image capture device includes a memory for storing a table for cross-referencing the focus value or a value used to determine the focus value to at least one of a distance between the subject and the image capture device, an aperture setting, a focal length, a circle of confusion, and a subject depth and the blurring function is configured to retrieve the focus value or the value used to determine the focus value from the table stored in the memory based on the cross-referencing.

22. A computer readable medium containing a computer program for providing background blurring when capturing an image using an image capture device, the computer program comprising executable instructions for:
   receiving input for initiating an image capture process for capturing an image of a subject at an image capture device;
   automatically determining a focus value corresponding to a focus distance that is less than a distance between the subject and the image capture device and that keeps the subject within a depth of field corresponding to the focus distance; and
   capturing the image using the determined focus value to provide background blurring in the captured image.

* * * * *

UNITED STATES PATENT AND TRADEMARK OFFICE
CERTIFICATE OF CORRECTION

PATENT NO. : 7,657,171 B2  Page 1 of 1
APPLICATION NO. : 11/427415
DATED : February 2, 2010
INVENTOR(S) : Robert J. Sundstrom It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 518 days.

Signed and Sealed this

Thirtieth Day of November, 2010

David J. Kappos
*Director of the United States Patent and Trademark Office*